March 25, 1952 — A. WAGNER — 2,590,829
CURTAIN SHUTTER CAMERA WITH FLASH SYNCHRONIZER ATTACHMENT
Filed Nov. 25, 1949 — 2 SHEETS—SHEET 1

INVENTOR.
ADAM WAGNER
BY
Fred A. Oklein
ATTORNEY

March 25, 1952   A. WAGNER   2,590,829
CURTAIN SHUTTER CAMERA WITH FLASH
SYNCHRONIZER ATTACHMENT
Filed Nov. 25, 1949   2 SHEETS—SHEET 2
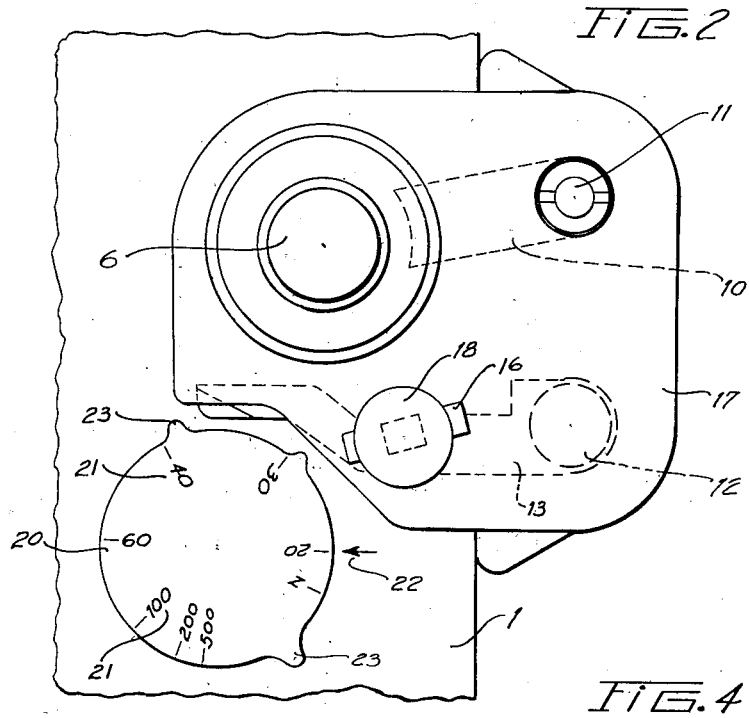
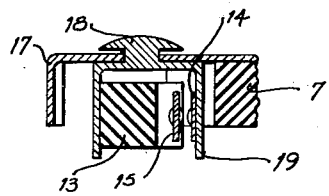
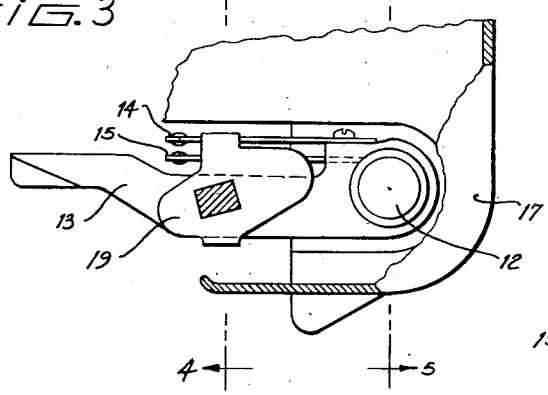
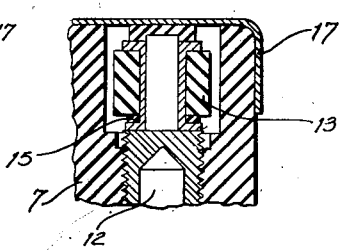
INVENTOR.
ADAM WAGNER
BY
ATTORNEY Patented Mar. 25, 1952

2,590,829

UNITED STATES PATENT OFFICE 2,590,829

CURTAIN SHUTTER CAMERA WITH FLASH SYNCHRONIZER ATTACHMENT

Adam Wagner, Wetzlar, Germany, assignor to Ernst Leitz, G. m. b. H., Wetzlar, Germany, a corporation of Germany Application November 25, 1949, Serial No. 129,290
In Germany May 11, 1949

3 Claims. (Cl. 95—11.5)

The present invention relates to improvements in cameras, and more particularly to an improved mechanism for synchronizing the release of the camera shutter and the ignition of a flash device attached thereto.

Heretofore with release devices of the above type it has not been possible to effect completely satisfactory synchronization between flash and shutter release. The operation of the release in these devices is also often so slow that the flash goes off before the shutter has opened.

It is, therefore, an object of the present invention to provide a release mechanism for a camera shutter and a flash device which assures perfect synchronization between the opening of the shutter and the ignition of the flash device.

It is a further object of this invention to provide a synchronized camera shutter and flash device release mechanism which may be simply attached to any camera housing, and which is adapted to be used for different flash types.

The above and other objects and advantages of the invention are accomplished by the provision of first means actuated by a release member at the start of the release movement for interrupting the ignition circuit, and second means actuated by the operation of the shutter for interrupting said circuit. In particular, the interruption of the electric circuit actuated by the release member is fixedly timed as part of the release member displacement, while the time for the interruption of the electric circuit actuated by the operation of the shutter is adjustable. Preferably, the release member carries a contact member which, after the release member has been partly displaced but before opening of the shutter, touches a contact blade which is in conductive connection with the current source for the ignition circuit and thus closes the interrupted circuit. The interruption will be automatically reinstated upon return of the release member to its rest position. The unwinding shutter operates release means for actuating a switch to close the ignition circuit. The switch actuated by the shutter is preferably adjustably mounted.

In a preferred embodiment of the invention, the release means operated by the unwinding shutter is adjustably arranged and is dependent on the exposure time for actuation of the switch which closes the ignition circuit. This release means may comprise a timing dial operated by the shutter, said dial being provided with release cams for different exposure times which, in turn, actuate the switch. The release means may also be detachably connected with the timing dial and may consist, for instance, of a cam bearer, known per se, which is clamped onto the timing dial. The cams may be of different height.

The entire synchronization device of the invention may be built as a compact structure adapted to be screwed or otherwise attached to a camera housing over the shutter release member, said device having one switch member in operative connection with a release means actuated by the shutter and said device being provided with plugs for making connection between the current source and the flash device.

The above objects, features and advantages of this invention will become more apparent from the following detailed description taken in connection with the accompanying drawing which is illustrative of some embodiments of the invention, and in which:

Fig. 2 is a top view of Fig. 1;

Fig. 3 shows the adjustable circuit interrupting means operable by the shutter;

Fig. 4 is a section of Fig. 3 along line 4—4;

Fig. 5 is a section of Fig. 3 along line 5—5; and

Figure 1:
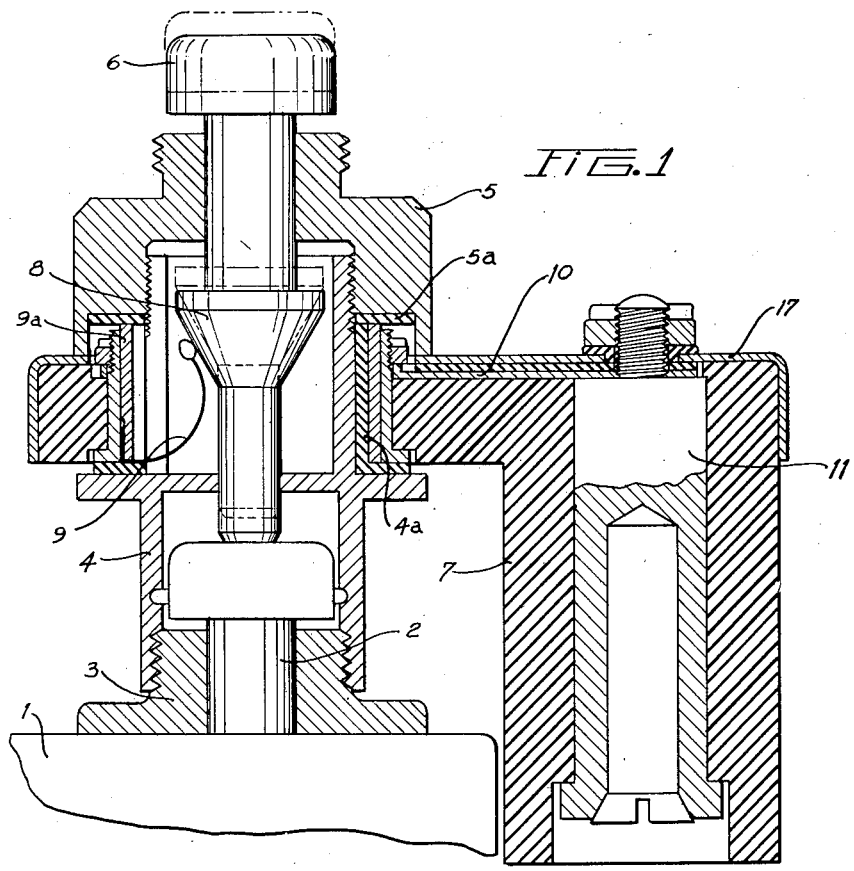
Fig. 1 shows, partly in section, the synchronization mechanism of the invention screwed onto a camera housing over its shutter release member.

In the drawing, 1 represents a conventional camera housing having a shutter release member 2 which moves in hub 3 which may be provided with screw threads for a wire release or the like. Housing 5 is screwed onto hub 3 by means of screw socket 4 and contains release member 6. Insulating body 7 of the synchronization mechanism is connected to housing 5. Release member 6 sits on the shutter release member 2 when housing 5 is screwed onto the camera housing. Inside the screw socket 4 and opposite a contact member 8 forming part of release member 6 there is arranged a contact blade 9 which is insulated from parts 4 and 5 and is in conductive connection with the insulated bushing 11 of a plug by means of insulated contact rail 10. The contact blade is carried by metal bushing 9a which is insulated from screw socket 4 and housing 5 by insulating bushing 4a and insulating disc 5a. The insulated contact rail 10 is in conductive connection with bushing 9a. The latter bushing also serves as a liner bushing for screwing the entire device onto camera housing 1. Metal bushing 9a, insulating bushing 4a and insulating disc 5a are braced with screw socket 4 and housing 5 and can be turned with them. The relative adjustment of the parts 4, 4a, 5, 5a, 9 and 9a may be effected by grub screws.

Referring now more particularly to Figs. 2, 3, 4 and 5, insulating body 7 is shown provided with a further bushing 12 which also serves as the pivotal axis for switch lever 13 which is insulated. Switch lever 13 carries a contact spring 14 which is pivotable with the switch lever, and opposite said contact spring is a further contact spring 15 which is coaxial with the switch lever 13. Contact spring 15 is joined with the switch lever 13 and is in conductive connection with the top of bushing 12 by means of the metallic hub of switch lever 13. The pivotable contact 14 is itself in conductive connection with cover 17 (see Fig. 4) and thereby with bushing 11. By pivoting switch lever 13 around its axis, the electric circuit can be closed and opened at contact springs 14, 15.

Switch lever 13 is in operative connection with timing dial 20 which is mounted on the camera housing 1 and is actuated by the shutter. The dial has exposure time calibrations 21 which can be adjusted in relation to fixed marker 22 provided on the camera housing. As shown in Fig. 2, one or more cams 23 may be placed around the circumference of timing dial 20, said cams corresponding to desired time adjustment values. The cams are adapted to move switch lever 13 upon unwinding of the shutter and thus close contacts 14, 15 in accordance with the set time value. The position of switch lever 13 is adjustable in relation to time dial 20 by means of setting slide 18, 19 which slides in slot 16 (see Figs. 2 and 3). At the same time, setting slide 19 effects the conductive connection between cover 17 and contact spring 14 and serves as stop-support therefor during the switch movement of switch lever 13 and contact spring 15.

Figure 6:
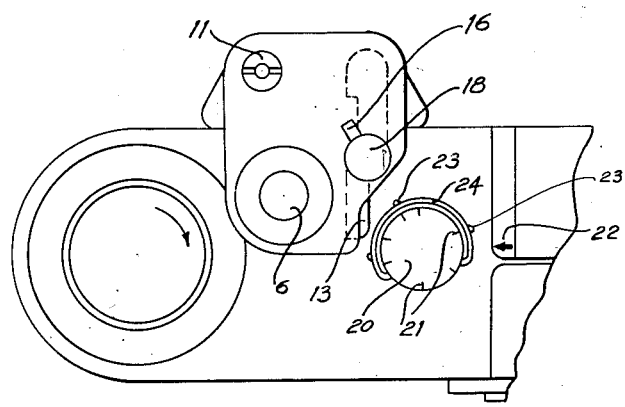
Fig. 6 shows a timing dial operated by the shutter and carrying a cam support clamped thereon.

Cams 23 of timing dial 20 may be of different height. If the flash is of very short duration (Electro Perma Flash), the shutter must be completely opened at the instant of ignition. This may be accomplished with only one cam or with cams of different height. The low cams will then be made inoperative by changing the position of switch lever 13 by means of setting slide 18, 19 and a higher cam must be provided so that this cam operates contact 14, 15 at the end of the unwinding of the first shutter curtain. Cams of different width may be provided instead of cams of different height. As shown in Fig. 6, it is also possible to provide a release means 24 clamped onto timing dial 20 instead of arranging cams around the circumference thereof.

The synchronization mechanism of this invention, as described, is arranged in one branch of the electric circuit from the current source to the flash device, via bushings 11 and 12; the other branch of the circuit leads directly from the current source to the flash device. The arrangement has the special advantage that a fuse—the circuit interrupter 8, 9—must be bridged before the unwinding or tensioning shutter can effect a flash ignition. Unwanted or improperly timed flash ignition will thereby be avoided. The device can easily be fitted to various flash types because of the adjustability of the ignition release system. The setting slide 18, 19 may be adjusted in accordance with markings which correspond to different flash types, which markings may be placed on the cover 17.

The operation of the device is as follows:

From a source of current, the current of the ignition circuit is first conducted to plug bushing 11 whence it is carried by contact rail 10 to metal bushing 9a and contact blade 9. When metallic release member 6 is pressed down partly and before it causes the opening of the camera shutter (Fig. 1, position shown in full lines), member 8 contacts the blade 9 and thereby effects the conductive connection of bushing 11 with metallic cover 17 by means of metallic parts 6, 5. Upon further downward movement of release member 6, the camera shutter will be opened under retention of contact 8, 9. Release member 6 will return to its starting position by means of conventional control spring means for camera shutters and contact 8, 9 will then be reopened. While contact 8, 9 is closed, current will flow from cover 17 to contact spring 14 by means of slide 18, 19. When spring contact 15 is brought into contact with contact 14 by the pivotal movement of switch lever 13 actuated by the unwinding shutter curtain, the current will enter bushing 12 and will return to the source of current via a flash bulb inserted between bushing 12 and the source of current. Thus, the ignition circuit will be closed and the flash bulb ignited only when contact 8, 9 as well as contact 14, 15 are closed, the first contact being operated by the release means for the shutter curtain and the second contact being operated by the unwinding shutter curtain.

If desired, the conductive parts of the synchronization mechanism or of the camera itself, which may be touched from the outside, may be insulated.

While the invention has been described in detail with reference to some now preferred embodiments thereof, as illustrated in the drawings, it is to be clearly understood that various modifications and variations are within the skill of the art without departing from the spirit and scope of the invention as defined and limited in the appended claims.

What is claimed is:

1. In combination with a focal plane shutter camera having a housing, shutter curtains, shutter release means on the housing, and a timer dial being moved in synchronization with the movement of the shutter curtains: a flash synchronization device comprising a hollow member and an insulating body fixedly attached thereto, means for removably attaching said hollow member and insulating body to said shutter release means, a supplementary release member movably guided in said hollow member and adapted to cooperate with the shutter release means, first contact means actuated by said release member for interrupting and closing an ignition circuit for the flash, said first contact means being disposed in said hollow member, plug means in said insulating body forming part of the ignition circuit, a switch lever pivotally attached to said insulating body, a setting slider on said insulating body engaging said switch lever and being adapted to adjust said switch lever in a desired position opposite said timer dial, second contact means in series with said first contact means and actuatable by said switch lever, the timer dial being provided with a plurality of cams, each of said cams being adjoined to a predetermined setting of the timer dial and being adapted to engage said switch lever in dependence of the setting of the timer dial, the engagement of the switch lever by said cam causing the switch lever to move pivotally to close said second contact means, the ignition circuit being closed and the flash ignited only when both contact means are closed.

2. Flash synchronization mechanism as defined in claim 1 wherein the cams are removably attached to the timer dial.

3. Flash synchronization mechanism as defined in claim 1 wherein the cams are of different length.

ADAM WAGNER.

REFERENCES CITED

The following references are of record in the file of this patent:

UNITED STATES PATENTS

| Number | Name | Date |
|---|---|---|
| 2,123,112 | Krueger | July 5, 1938 |
| 2,284,486 | Hineline | May 26, 1942 |
| 2,291,190 | Schwartz et al. | July 28, 1942 |
| 2,326,364 | King | Aug. 10, 1943 |
| 2,455,365 | Jenner | Dec. 7, 1948 |
| 2,471,219 | Kennedy | May 24, 1949 |
| 2,514,302 | Aiken | July 4, 1950 |
| 2,517,407 | Nilsen | Aug. 1, 1950 |
| 2,520,638 | Hulstein | Aug. 29, 1950 |

FOREIGN PATENTS

| Number | Country | Date |
|---|---|---|
| 724,336 | Germany | Aug. 24, 1942 |